(12) United States Patent
Tajiri et al.

(10) Patent No.: US 10,578,015 B2
(45) Date of Patent: Mar. 3, 2020

(54) FLEXIBLE JOINTS ASSEMBLY WITH FLEXURE RODS

(71) Applicant: Unison Industries, LLC, Jacksonville, FL (US)

(72) Inventors: Gordon Tajiri, Allentown, PA (US); Michael Thomas Kenworthy, Gilbert, AZ (US); Dattu G V Jonnalagadda, Ponnur (IN); Jason Levi Burdette, Beavercreek, OH (US); Lonnie Ray Stewart, Jr., Carlisle, OH (US)

(73) Assignee: Unison Industries, LLC, Jacksonville, FL (US)

( * ) Notice: Subject to any disclaimer, the term of this patent is extended or adjusted under 35 U.S.C. 154(b) by 144 days.

(21) Appl. No.: 15/415,083

(22) Filed: Jan. 25, 2017

(65) Prior Publication Data
US 2018/0209569 A1     Jul. 26, 2018

(51) Int. Cl.
*F02C 6/08*     (2006.01)

(52) U.S. Cl.
CPC .......... *F02C 6/08* (2013.01); *F05D 2220/323* (2013.01)

(58) Field of Classification Search
CPC ....... F16L 27/107; F16L 27/11; F16L 27/108; F16L 27/12; F16L 27/125; F16L 27/1085; F16L 27/111
USPC ................................ 285/226, 184, 282, 223
See application file for complete search history.

(56) References Cited

U.S. PATENT DOCUMENTS

| | | | | |
|---|---|---|---|---|
| 2,707,117 A | * | 4/1955 | Fentress | F16L 51/027 138/121 |
| 2,969,247 A | * | 1/1961 | Eggmann | F16L 27/111 138/120 |
| 3,029,094 A | * | 4/1962 | Parlasca | F16L 27/111 285/114 |
| 3,168,334 A | * | 2/1965 | Johnson | E21B 17/085 138/139 |
| 3,186,742 A | * | 6/1965 | Frankel | F16L 27/111 285/114 |
| 3,232,640 A | * | 2/1966 | Donkle, Jr. | F16L 27/111 138/121 |
| 3,768,843 A | * | 10/1973 | Burtis | F16L 23/0286 285/114 |

(Continued)

FOREIGN PATENT DOCUMENTS

| | | |
|---|---|---|
| CN | 202868184 U | 4/2013 |
| GB | 988 952 A | 4/1965 |

(Continued)

OTHER PUBLICATIONS

Extended European Search Report and Opinion issued in connection with corresponding EP Application No. 18152968.6 dated Mar. 28, 2018.

(Continued)

*Primary Examiner* — Aaron M Dunwoody
(74) *Attorney, Agent, or Firm* — McGarry Bair PC

(57) ABSTRACT

A flexible joint assembly for a joint between a first duct and a second duct for providing a flow of fluid, such as bleed air in an aviation implementation. The flexible joint includes a bellows supported by a mounting assembly having a first support and a second support, each surrounding a portion of the bellows. A set of rod assemblies can operably couple the first support and the second support.

15 Claims, 12 Drawing Sheets

(56) References Cited

U.S. PATENT DOCUMENTS

| | | | |
|---|---|---|---|
| 4,204,707 A * | 5/1980 | Linciconne | B60H 1/00571 138/121 |
| 4,791,963 A * | 12/1988 | Gronert | F16L 11/115 138/106 |
| 5,286,071 A | 2/1994 | Storage | |
| 5,370,427 A | 12/1994 | Hoelle et al. | |
| 5,407,237 A | 4/1995 | Smolowitz | |
| 5,584,511 A | 12/1996 | Gonzalez et al. | |
| 5,611,577 A | 3/1997 | Meyer et al. | |
| 6,631,928 B1 * | 10/2003 | Sakata | F16L 27/1085 285/226 |
| 6,860,519 B2 | 3/2005 | Berengut et al. | |
| 7,677,606 B2 | 3/2010 | Rohwedder | |
| 2007/0176417 A1 * | 8/2007 | Nuccitelli | F16L 27/111 285/227 |
| 2008/0042430 A1 * | 2/2008 | Ichikawa | F02M 35/10144 285/61 |
| 2008/0100060 A1 * | 5/2008 | Hayashi | F16L 23/003 285/148.8 |
| 2009/0230676 A1 * | 9/2009 | Rohwedder | F16L 27/111 285/301 |
| 2011/0181041 A1 * | 7/2011 | Argersinger | F16L 27/1012 285/223 |
| 2013/0015653 A1 * | 1/2013 | Cipra | F02K 9/84 285/114 |
| 2016/0146394 A1 * | 5/2016 | Richter | F16L 27/1085 285/93 |

FOREIGN PATENT DOCUMENTS

| | | |
|---|---|---|
| GB | 988952 A | 4/1965 |
| JP | 61-066289 U1 | 5/1986 |
| JP | 3028686 U1 | 9/1996 |
| JP | 2008111530 A | 5/2008 |
| WO | 2006/125667 A1 | 11/2006 |
| WO | 2006125667 A1 | 11/2006 |

OTHER PUBLICATIONS

Office Action issued in connection with corresponding CA Application No. 2991622 dated Oct. 22, 2018.

Search report issued in connection with corresponding EP Application No. 18152968.6 dated Mar. 28, 2018.

Japanese Office Action issued in related Japanese Patent Application No. 2018-006838, 5 pages, dated Mar. 19, 2019, Japan.

* cited by examiner

US 10,578,015 B2

FLEXIBLE JOINTS ASSEMBLY WITH FLEXURE RODS

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine stages, also including multiple pairs of rotating blades and stationary vanes.

Duct assemblies are provided about the turbine engine and provide conduits for the flow of various operating fluids to and from the turbine engine. One of the operating fluids is bleed air. In the compressor stages, bleed air is produced and taken from the compressor via feeder ducts. Bleed air from the compressor stages in the gas turbine engine can be utilized in various ways. For example, bleed air can provide pressure for the aircraft cabin, keep critical parts of the aircraft ice-free, or can be used to start remaining engines. Configuration of the feeder duct assembly used to take bleed air from the compressor requires rigidity under dynamic loading, and flexibility under thermal loading. Current systems use ball-joints or axial joints in the duct to meet requirements for flexibility, which compromise system dynamic performance and increase the weight of the system.

BRIEF DESCRIPTION OF THE INVENTION

In one aspect, the present disclosure relates to a duct assembly for a gas turbine engine including a first duct, a second duct, and a flexible joint assembly coupling the first duct to the second duct. The joint assembly includes a bellows having a first end and a second end. The first end of the bellows surrounds an outer surface end portion of the first duct, and the second end of the bellows surrounds an outer surface end portion of the second duct. The joint assembly also includes a mounting assembly, having a first support and a second support. One of the first support and the second support surrounds at least a portion of the first end of the bellows, and the other of the first support and the second support surrounds at least a portion of the second end of the bellows. The joint assembly further includes a set of rod assemblies operably coupled to the first support and the second support. The set of rod assemblies operably couples to the first and second support and spans a length there between. The set of rod assemblies is configured to act as spherical flexures to allow three rotational degrees of freedom at the flexible joint assembly.

In another aspect, the present disclosure relates to a joint assembly including a bellows fluidly coupling a first duct to a second duct and having a first end and a second end, with the first end of the bellows surrounding a portion of the first duct, and the second end of the bellows surrounding a portion of the second duct. The joint assembly includes a mounting assembly with a first support and a second support. One of the first support and the second support surrounds at least a portion of the first end of the bellows and the other of the first support and the second support surrounds at least a portion of the second end of the bellows. A set of rod assemblies operably couples the first support and the second support and spans a length there between. At least one rod assembly of the set of rod assemblies includes a rod bundle having a protective sheath wrapping at least a portion of an exterior of the rod bundle.

In yet another aspect, the present disclosure relates to a joint assembly including a bellows having a first end and a second end with convolutions located there between. The first end of the bellows surrounds a portion of the first duct, and the second end of the bellows surrounds a portion of the second duct. A mounting assembly includes a first support and a second support. One of the first support and the second support surrounds at least a portion of the first end of the bellows, and the other of the first support and the second support surrounds at least a portion of the second end of the bellows. A set of rod assemblies operably couples the first support and the second support and spans a length there between. A length of the rod assemblies is sized to correspond to the convolutions of the bellows being in a compressed state such that the bellows are preloaded.

DESCRIPTION OF EMBODIMENTS OF THE INVENTION

Figure 1:
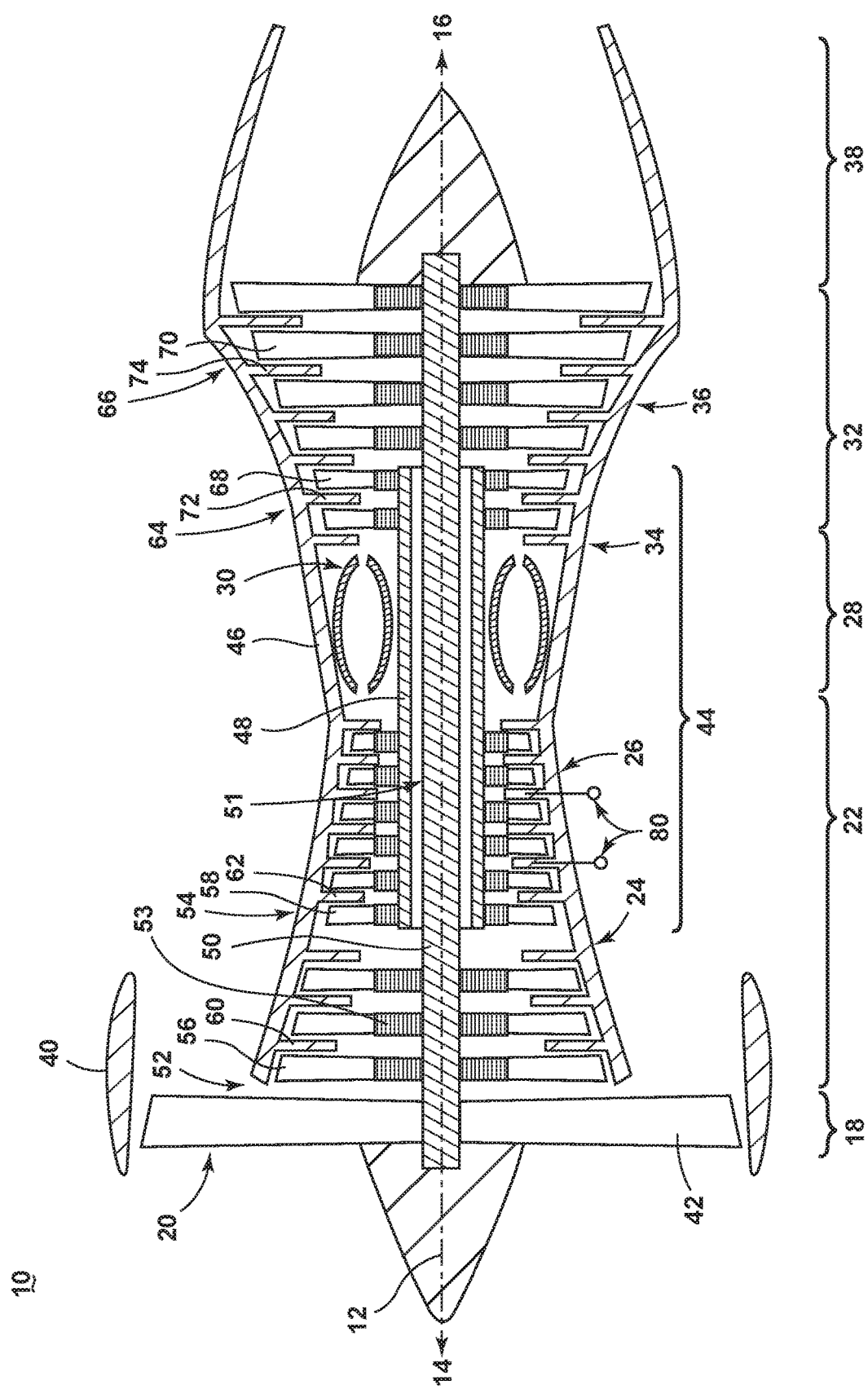
FIG. 1 is a schematic cross-sectional view of a gas turbine engine with a bleed air ducting assembly in accordance with various aspects described herein.

The described embodiments of the present invention are directed to providing a tunable, variable-section flexure for frictionless, wear-free flexible joint assemblies for improved rotational compliance for reduced reaction loading into the fan case of turbine engines during assembly and thermal growth of high temperature bleed-air ducting systems. For purposes of illustration, the present invention will be described with respect to an aircraft gas turbine engine. Gas turbine engines have been used for land and nautical locomotion and power generation, but are most commonly used for aeronautical applications such as for airplanes, including helicopters. In airplanes, gas turbine engines are used for propulsion of the aircraft. It will be understood, however, that the invention is not so limited and can have general applicability in non-aircraft applications, such as other mobile applications and non-mobile industrial, commercial, and residential applications. Additionally, the described embodiments will have equal applicability to any ducting system experiencing high system loading or large thrust and shear loads requiring a flexible joint assemblies to connect elements.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a set of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a set of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, respectively, with stages having their own disks. The vanes 60, 62 are mounted to the core casing 46 in a circumferential arrangement about the rotor 51.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the air from the compressor section 22 can be bled off via one or more bleed air duct assemblies 80, and be used for cooling of portions, especially hot portions, such as the HP turbine 34, or used to generate power or run environmental systems of the aircraft such as the cabin cooling/heating system or the deicing system. In the context of a turbine engine, the hot portions of the engine are normally downstream of the combustor 30, especially the turbine section 32, with the HP turbine 34 being the hottest portion as it is directly downstream of the combustion section 28. Air that is drawn off the compressor and used for these purposes is known as bleed air.

Figure 2:
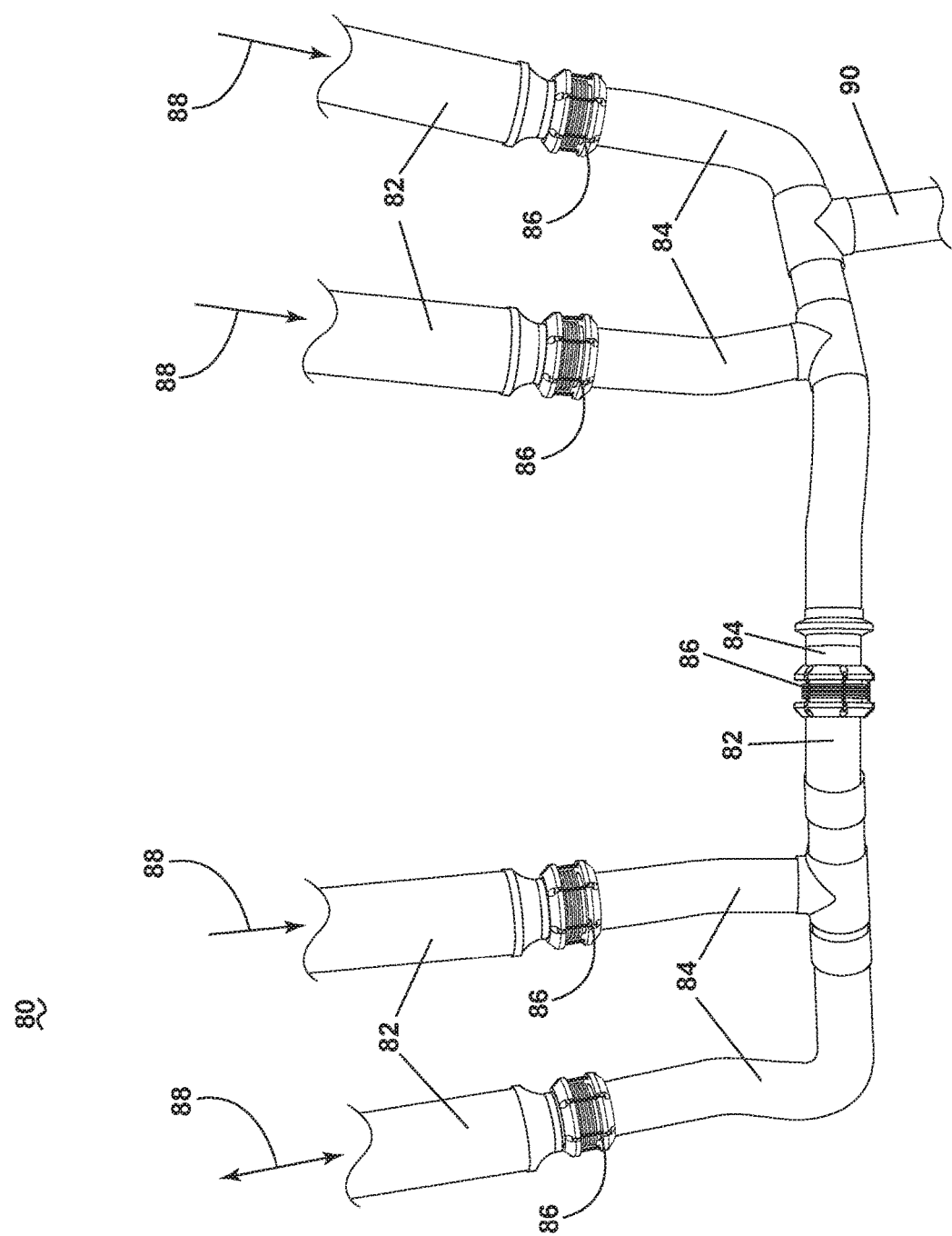
FIG. 2 is a perspective view of the bleed air ducting assembly having multiple flexible joints in accordance with various aspects described herein.

Referring to FIG. 2, an exemplary bleed air duct assembly 80 includes radially inner first ducts 82 and radially outer second ducts 84. The first and second ducts 82, 84 can be fixed in their position. It should be understood that the first ducts 82, being disposed radially inside of the outer ducts 84 is exemplary, and that the first and second ducts 82, 84 can have any position or orientation relative to one another. A joint assembly 86 couples the first and second ducts 82, 84. A flow of bleed air 88 can be drawn from the compressor section 22 (FIG. 1), for example, into the first ducts 82, through the second ducts 84, and provided to an exhaust duct 90 for use in various other portions of the engine 10 or aircraft. The flow of bleed air 88 can thermally heat and expand portions of the bleed air duct assembly 80. Alternatively, ambient or system temperatures around the bleed air duct assembly 80 can cause expansion and contraction ducts 82, 84, imparting axial loading along the ducts 82, 84. Such loading can cause bending or shearing forces at the ducts 82, 84 or the joints assemblies 86. The joint assemblies 86 provide for reducing or mitigating loading forces or any force acting on the bleed air duct assembly 80, while providing for operational flexion of the bleed air duct assembly 80. For example, the flexible joint assemblies 86 provides for transfer, kinematic movement, and bending movement of the duct assembly 80 under large thrust and shear loads at the interface between the first and second ducts 82, 84.

Figure 3:
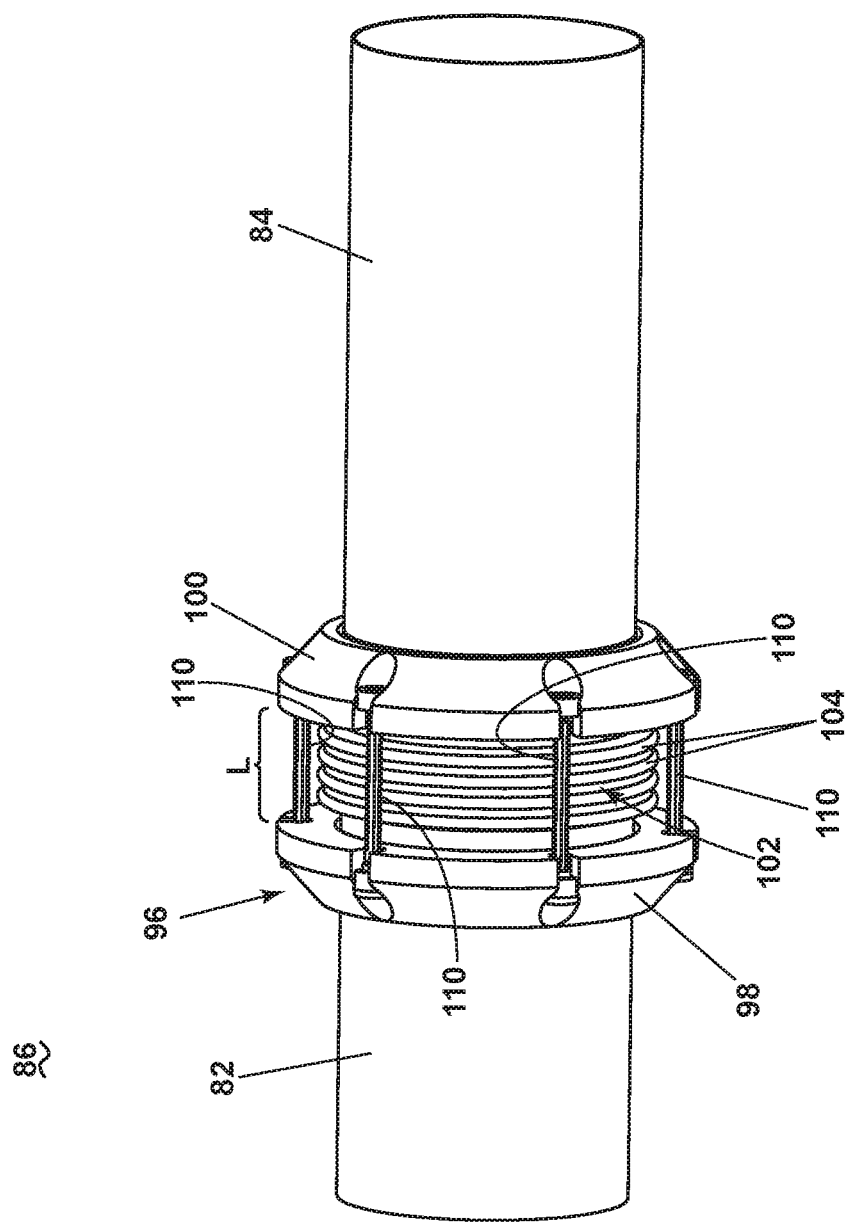
FIG. 3 is an enlarged, perspective view of one flexible joint of FIG. 2 in accordance with various aspects described herein.

FIG. 3 illustrates an exemplary joint assembly 86 that can be utilized in coupling the first duct 82 to the second duct 84. The joint assembly 86 includes a mounting assembly 96 having a first support 98 and a second support 100. A bellows 102 couples between the first and second supports 98, 100, fluidly coupling the first duct 82 to the second duct 84. The bellows 102 includes a plurality of convolutions 104. The bellows 102 is coupled under a compressive pre-load. The pre-load is constrained based upon the length of the bellows 102 and the rod assemblies 110, discussed in detail later on. Such a length can determine the compressive displacement of the bellows. The bellows 102 can include a first end 114 and a second end 116 (best seen in FIG. 4). The first end 114 of the bellows 102 can couple to the first duct 82, and the second end 116 of the bellows 102 can couple to the second duct 84. For example, the first and second supports 98, 100 can include a lip or a skirt. The bellows 102 can stack within the lip or skirt. A penetration laser weld can be used to seal the assembly, which can couple to the adjacent first or second duct 82, 84 with a butt weld.

A set of rod assemblies 110 extends between the first and second supports 98, 100, positioned radially exterior of the bellows 102. The rod assemblies 110 are illustrated as being equally spaced circumferentially about the supports 98, 100. It is contemplated that the rod assemblies 110 can be unequally spaced based upon anticipated loading at discrete portions of the joint assembly 86. The set of rod assemblies 110 span a length L between the first support 98 and the second support 100. The length L can be measured as the distance between the first support 98 and the second support when the bellows 102 is in a compressed position. As such, the set of rod assemblies can be sized to correspond to the length L for the bellows 102 in a compressed state, to form the joint assembly 86 having the preload at the bellows 102.

While not shown, it is contemplated that the joint assembly 86 is housed within an exterior housing or casing, where it may be undesirable to expose the bellows 102 or other components to the exterior of the joint assembly 86. Such a casing can mount to the first and second ducts 82, 84, or to the first and second supports 98, 100 in non-limiting examples.

Figure 4:
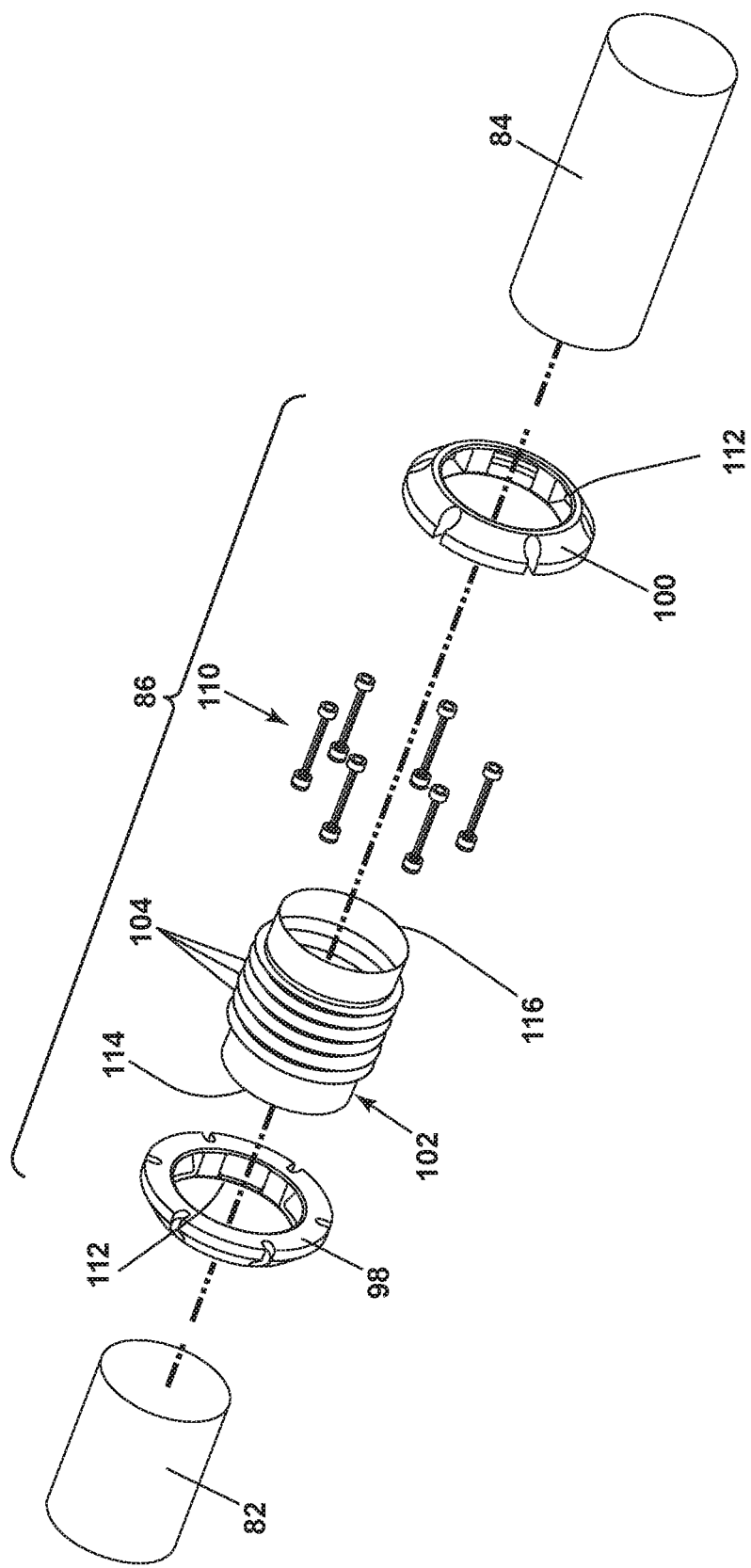
FIG. 4 is an exploded view of the flexible joint of FIG. 3 in accordance with various aspects described herein.

FIG. 4 illustrates an exploded view of the joint assembly 86. The first and second supports 98, 100 can include a lip 112. The bellows 102 can be provided within the circumference of the first and second supports 98, 100 extending to the lip 112. The ends of the bellows 114, 116 at the lips 112 can mount to the first and second ducts 82, 84 in any manner, such as with a butt weld. While FIG. 4 illustrates particular ends 114, 116 of the bellows 102, particular supports 98, 100, and particular ducts 82, 84 in one particular organization and organization for coupling the joint assembly 86, it should be understood that such an organization is non-limiting, such that either duct 82, 84 can mount to either end 114, 116 of the bellows 102, having any one support 98, 100 surrounding either end 114, 116, of the bellows 102 and either duct 82, 84. Any combination is contemplated, such that the first and second ducts 82, 84 couple to the joint assembly 86 and fluidly seal the joint assembly 86.

Figure 5:
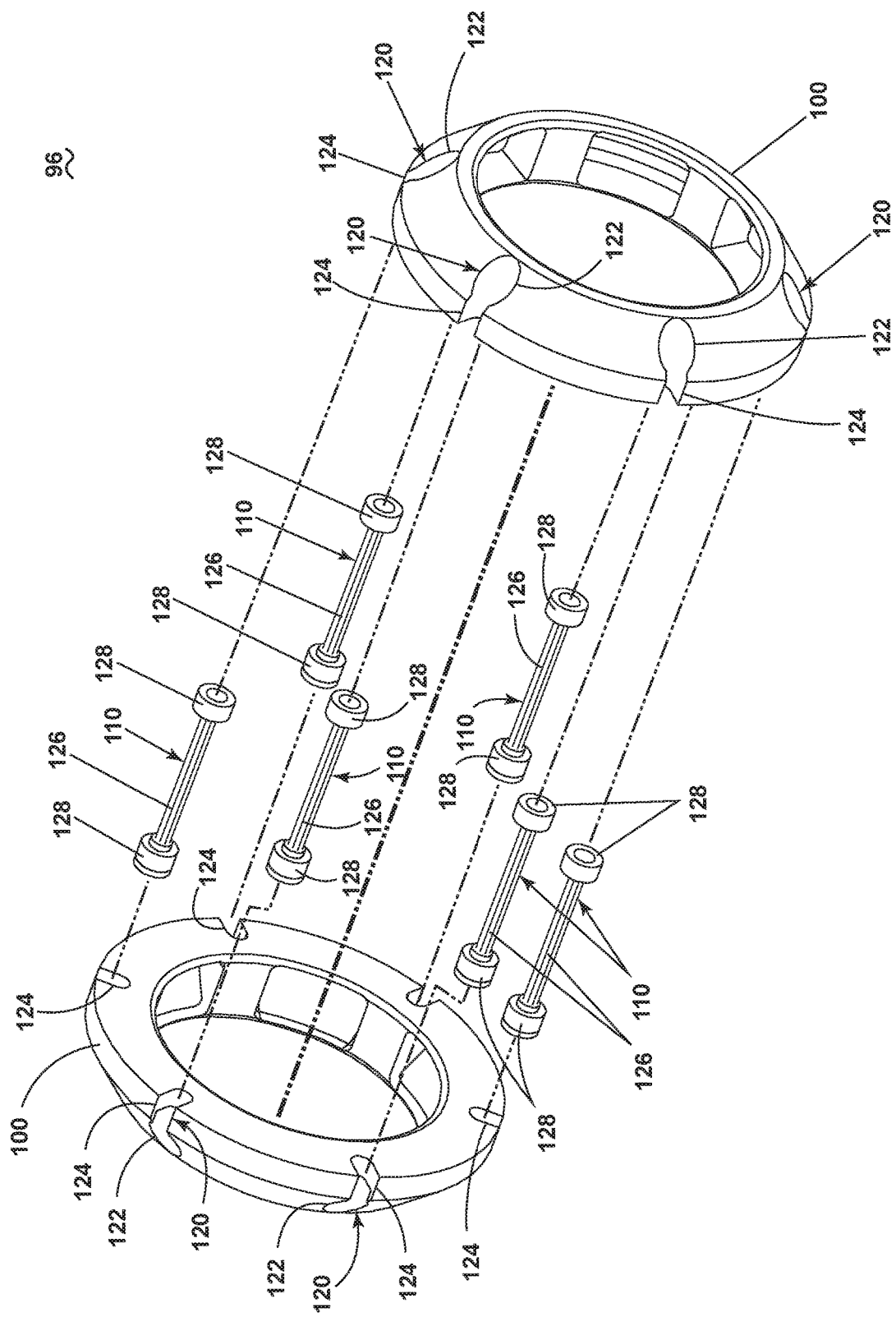
FIG. 5 is an exploded view of the flexible joint of FIG. 4, isolating two fixtures with rod assemblies in accordance with various aspects described herein.

FIG. 5 illustrates a subset of the joint assembly 86 including the two supports 98, 100 and the set of rod assemblies 110 for clarity purposes. The annular supports 98, 100 includes a set of mounting tab slots 120. The mounting tab slots 120 can be formed in the exterior of the first and second supports 98, 100. Each mounting tab slot 120 can include a wide mouth 122 and a narrow throat 124. While six mounting tab slots 120 are shown on each support 98, 100, any number of mounting tab slots 120 are contemplated. A complementary number of rod assemblies 110 or an alternative number of rod assemblies 110 can be utilized.

Furthermore, as with the rod assemblies, the mounting tab slots 120 can be equally spaced about the supports 98, 100, or can be discretely arranged, having one, some, or a set of slots 120 arranged or grouped closer to each other. The opposing support 98, 100 can include a complementary set of mounting tab slots 120, adapted to receive the set of rods 110 extending between the supports 98, 100 in a substantially axial direction defined by the local bleed air duct assembly.

Each rod assembly 110 includes a rod bundle 126 disposed between opposing end bushings 128. The rod bundle 126 can mount between the opposing bushing 128, and can couple at the bushing 128 by welding, for example. The bushings 128 are sized for reception in the wide mouth 122 of the mounting tab slots 120. The rod bundle 126 is sized, such as having a particular diameter, to slide through the narrow throat 124 to enable insertion of the bushings 128 into the wide mouths 122, to secure the rod assembly 110 at each of the mounting tab slots 120. Upon insertion, the narrow throat 124 prevents sliding of the bushings 128 through the mounting tab slots 120, securing the rod assemblies 110 to the supports 98, 100. The compressed convolutions 104 of the bellows 102 (FIG. 3) provides a preload to secure the rod assemblies 110 in the mounting tab slots 120 at the bushings 128.

The set of rod assemblies 110 can include sets of flexible alloy rods, which can be made of high temperature, spring-tempered alloy. The rod assemblies 110 act as rotational flexures at the joint assembly 86 to permit three rotational degrees of freedom at the joint assembly 86. Each rod assembly 110 can be adapted to dampen high thrust loads, having a high bending moment for the joint assembly 86. The use of the rod assemblies 110 between the two supports 98, 100 decouples the high internal thrust pressure loads from the frictional interface, reaction shear loads. Traditional designs utilize a 'ball' joint with a spherical face contacting an outer shroud, which can experience a large amount of friction as internal pressure increases. The rod assemblies 110 decouple shrouds, to remove the frictional forces of the spherical face of the traditional 'ball' joint. Any axial loading on the joint assembly 86 is carried by the external rod assemblies 110 in the axial direction relative to the local bleed air duct assembly 80. In addition, the rod assemblies 110 permit three degrees of rotational freedom for small angular rotations of the joint assembly 86. This can include, but is not limited to, less than eight-degrees in any given combined rotational direction. Additionally, using multiple rod assemblies 110 provides for distribution of axial loading and the bending moment loads equally among the rod assemblies 110 circumferentially about the joint assembly 86 in an evenly-spaced rod assembly arrangement. As such, the number of rod assemblies 110 used or the particular arrangement of the rod assemblies 110 can be organized based upon anticipated axial loads or bending moment loads. In non-limiting examples, the number of rod assemblies 110 can be three, four, six, or eight, while any number or rod assemblies 110 is contemplated. Use of the rod assemblies 110 in the joint assembly 86 results in a lightweight, compact, and simplified zero-backlash design for rotational kinematic motion, about three degrees of freedom, without interfacial wear, friction, and associated high rotational stiffness.

Figure 6A:
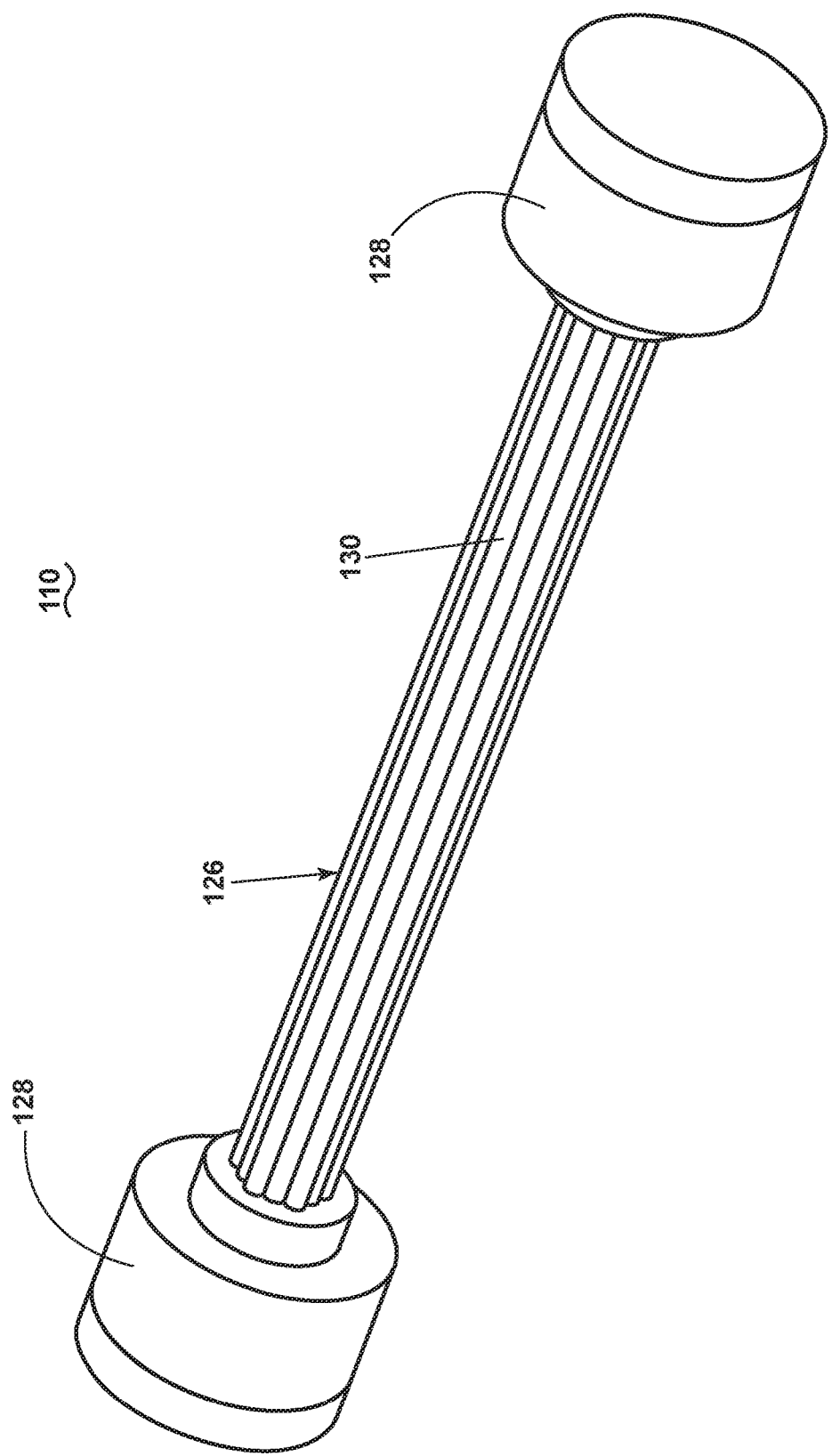
FIG. 6A is an enlarged view one rod assembly of FIG. 5 having linear rods, in accordance with various aspects described herein.

Additionally, the rod assemblies 110 can be individually adapted based upon anticipated axial and bending moment loads. FIG. 6A illustrates an enlarged view of one rod assembly 110. The rod assembly 110 can include a rod bundle 126, including a number of flexible alloy rods 130. In one example, the flexible alloy rods 130 can be linear, extending between the opposing bushings 128 without any forces acting upon the rod assembly 110. The number of flexible alloy rods 130 of the rod bundle 126 can be adapted based upon, for example, anticipated loads. Additionally, the material utilized for the flexible alloy rods 130 can be changed based upon expected loads or operational temperatures. Such materials, for example, can include flexible alloys. In yet another example, the diameter of each individual flexible alloy rods 130 can be adapted based upon the anticipated loads. Similarly, other variables such as rod length, operational temperatures, of other factors can be determinative of changes or adaptations made to the rod assemblies 110 based upon the anticipated loading.

Figure 6B:
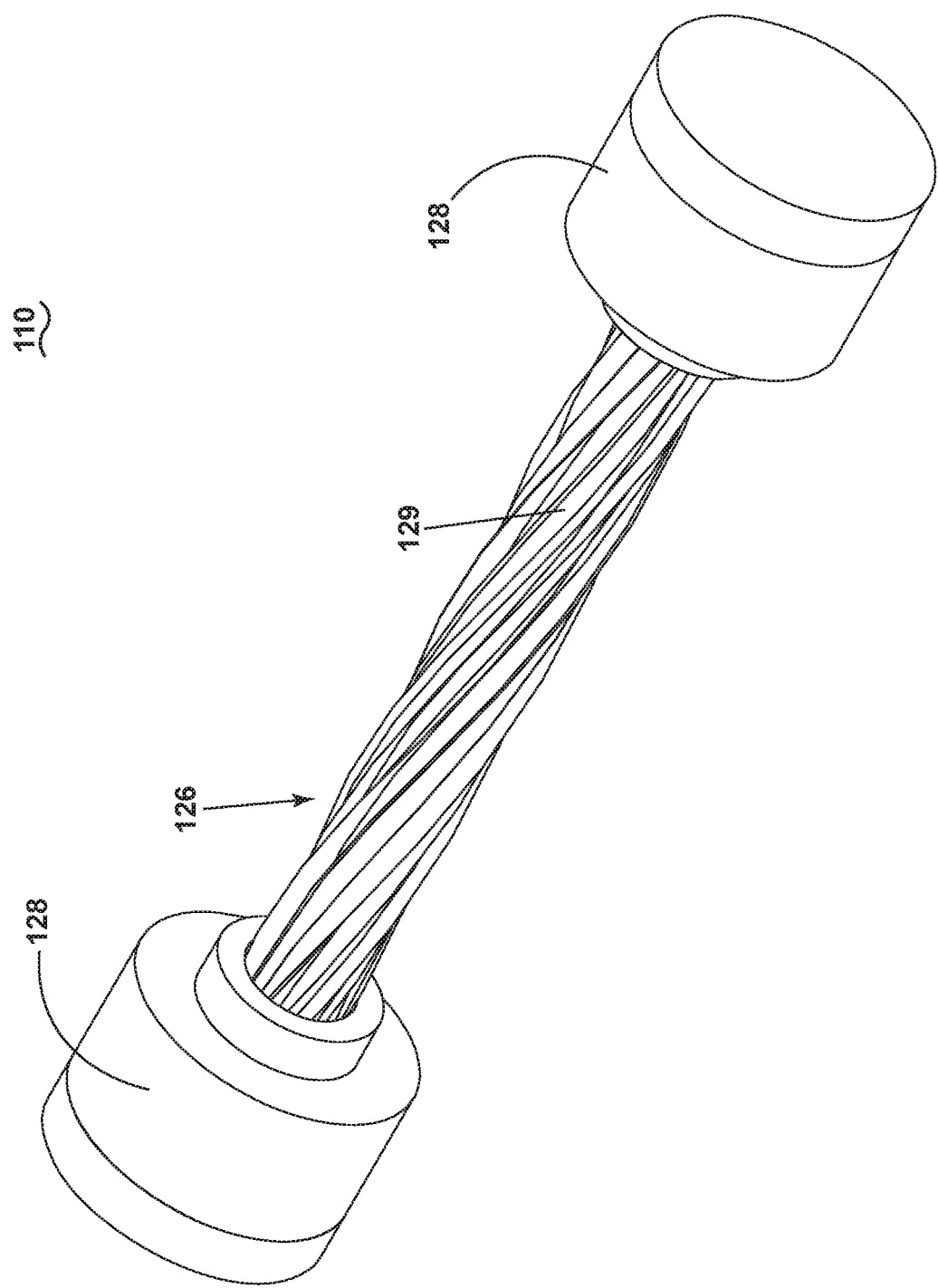
FIG. 6B is an enlarged view of an alternative rod assembly having a helical rods, in accordance with various aspects described herein.

FIG. 6B illustrates the rod assembly 110 having the rod bundle 126 organized as a number of helical flexible alloy rods 129 to form a group of wound rods or a helical wound cable, having a predetermined pitch. Such a pitch can be used to adapt the rod assemblies 110 based upon anticipated axial loading or the magnitude of bending loads. Thus, the particular organization of the rods 129, 130 can be based upon the anticipated loading. For example, the helical flexible alloy rods 129 can provide for increased flexion, under lower anticipated loads, as opposed to the linear rods 130 of FIG. 6A, providing for lesser flexion under higher anticipated loads. As such, the geometry or organization of the individual rods 129, 130 can be adapted based upon the anticipated loads. In an additional example, the rod assembly 110 can have a combination of linear rods 130 and helical rods 129, such as a set of linear rods 130 surrounded by a layer of helically-wrapped rods 129.

Figure 7:
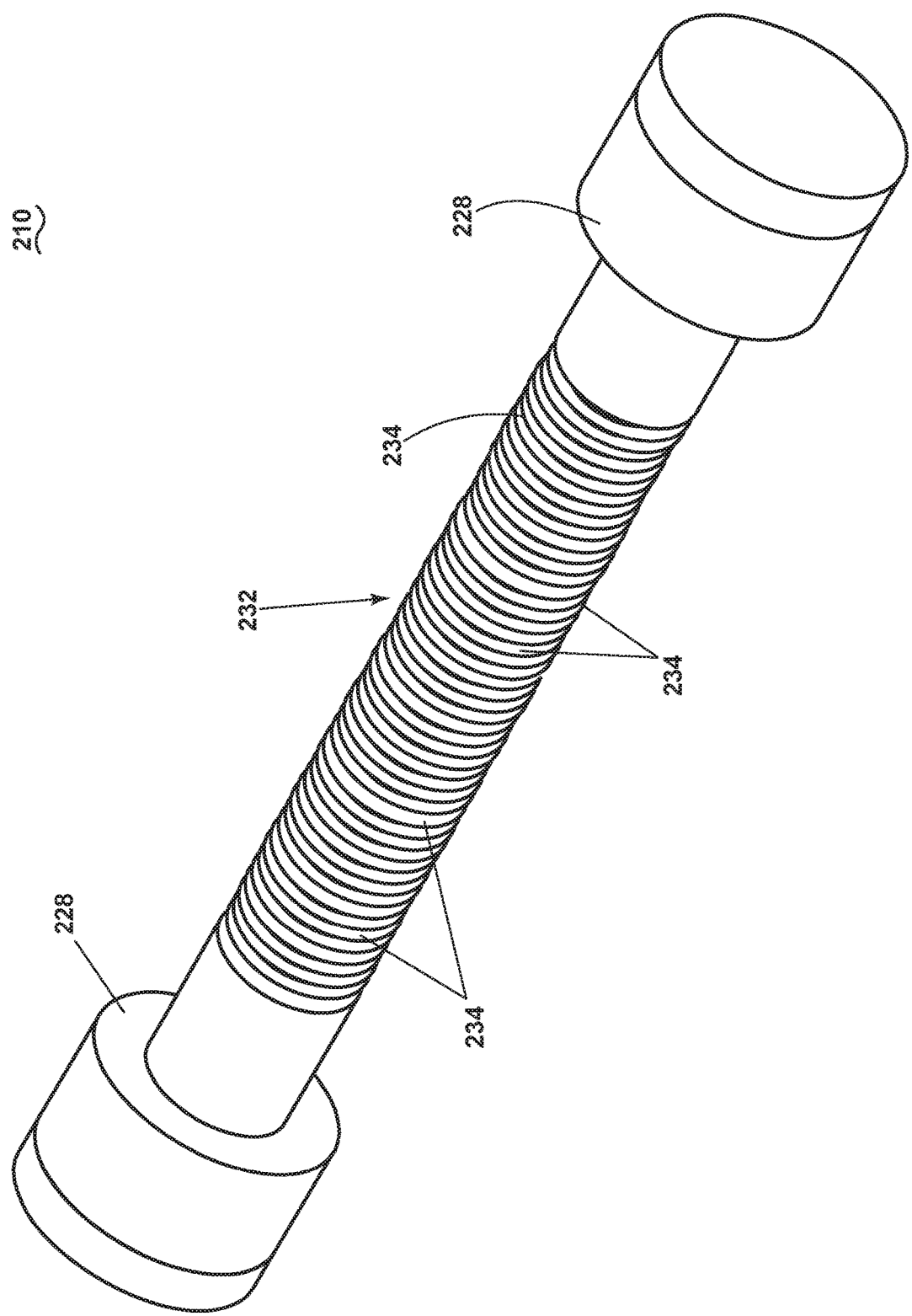
FIG. 7 is a perspective view of an alternative rod assembly for the flexible joint of FIG. 3, including a helical sheath, in accordance with various aspects described herein.

FIG. 7 illustrates another exemplary rod assembly 210. The rod assembly 210 of FIG. 7 can be substantially similar to the rod assemblies 110 of FIGS. 3-6B. As such, similar numerals will be used to describe similar elements increased by a value of one hundred. A rod bundle (now shown) is arranged between two bushings 228.

Regardless of whether the flexible alloy rods of the rod bundle are straight (FIG. 6A) or helically wound (FIG. 6B), a protective sheath 232 can wrap around at least a portion of the rod assembly 210, covering the rod bundle. In the illustrated example, the protective sheath 232 includes a helical, compliant sheath including a plurality of coils 234 provided around the rod bundle between the bushings 228 to form a helical coil sleeve. The sheath 232 can protect the rod bundle, while providing support for additional loading. For example, the sheath 232 can be coiled as a spring having a particular spring constant based upon the pitch and material of the plurality of coils 234. Such a sheath 232 can support axial loading along the longitudinal axis of the sheath 232 under compression or decompression. Additionally, the sheath 232 can support bending moment loading and kinematic motion in rotational degrees of freedom outside of axial. Furthermore, the plurality of coils 234 of the sheath 232 can be tailored based upon pitch to support anticipated load while remaining compliant with the preload of the bellows (FIG. 3). As such, the sheath 232 can be particularly tailored based upon the anticipated loading and kinematic motion at the rod assembly 210 and the entire joint assembly 86 (FIG. 3).

Figure 8:
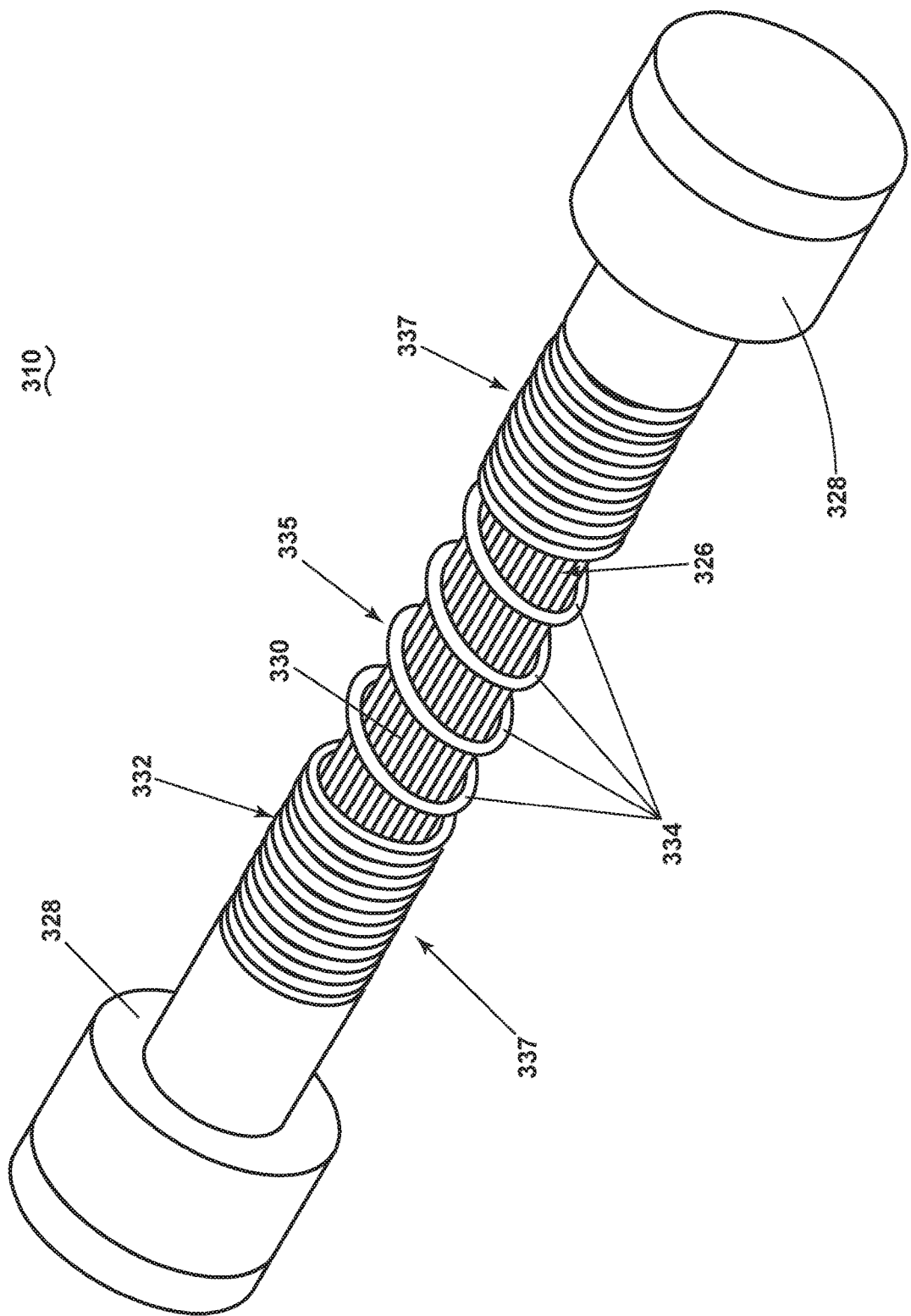
FIG. 8 is a perspective view of the rod of FIG. 7, including an alternative helical sheath, in accordance with various aspects described herein.

FIG. 8 illustrates yet another exemplary rod assembly 310. The rod assembly 310 of FIG. 8 can be substantially similar to the rod assembly of FIG. 7. As such, similar numerals will be used to describe similar elements increased by a value of one hundred.

The rod assembly 310 can include a sheath 332 with a helical coil sleeve shown as coils 334 having a pitch such that the coils 334 are spaced 335 near the center of the rod assembly 310, exposing the rod bundle 326, and tightly arranged 337 near the bushings 228. The spaced portion 335 can be along any length of the sheath 332. As such, the sheath 332 can be discretely or locally tailored to support the loading and kinematic motion acting on the joint assembly 86 (FIG. 3). The spaced coils 335 near the center of the rod assembly 310 can be used to support a particular range of axial loading, while directing any bending moment loading and controlled motion to the center of the rod assembly 310. As such, the bending moment and shear force of the joint assembly 86 (FIG. 3) can be directed to an axial center of the rod assembly 310 as opposed to another position, which may be less suited to the bending moments or shear forces.

Figure 9:
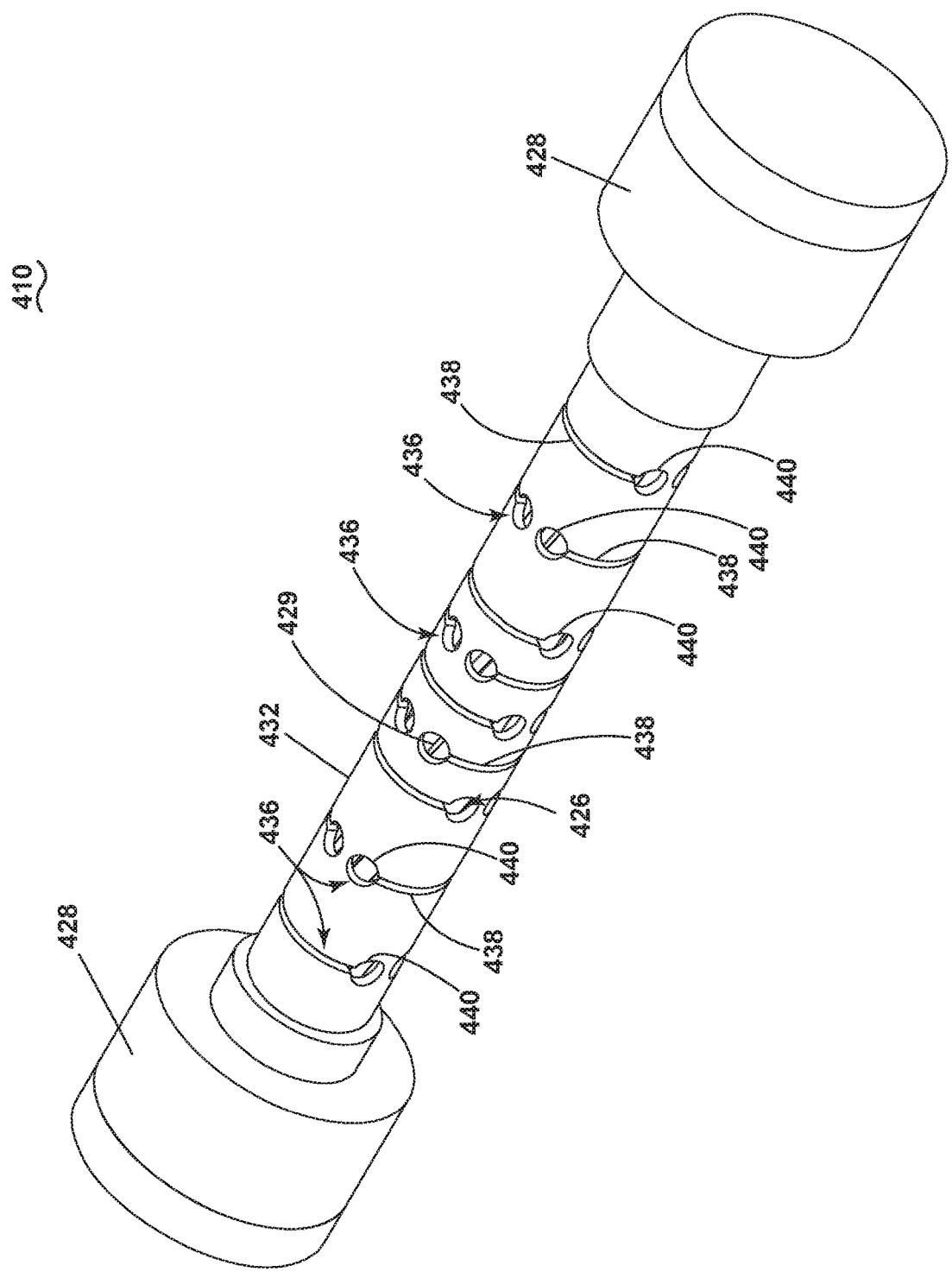
FIG. 9 is a perspective view of another alternative rod assembly for the flexible joint of FIG. 3 having a cylindrical sheath with a cutout pattern, in accordance with various aspects described herein.

Referring now to FIG. 9, another exemplary sheath 432 is illustrated on a rod assembly 410. The rod assembly 410 can be substantially similar to the rod assembly 310 of FIG. 8, except having helical flexible alloy rods 429 forming a rod bundle 426. As such, similar elements will be described with similar numerals increased by a value of one hundred. The sheath 432 is generally cylindrical and extends between the bushings 428. A system of apertures 436 are provided through the sheath 432. In the illustrated example, the apertures include a linear slit 438 connecting two end openings 440. The apertures 436 are formed around the sheath 432, such that the two end openings 440 are positioned adjacent to one another, but slightly spaced from one another. The portion of the sheath 432 between the end openings 440 creates a rotational flexure. The rotational flexures are sized for a particular spring constant and magnitude of rotation. The linear slits 438 extend in the circumferential direction about a longitudinal axis defined through the rod assembly 410. The apertures 436 provide for flexion of the sheath 432 complementary to flexion of the rod bundle 429. A variable pitch of the slits can also control the local stiffness of the sheath 432. Simply put, more apertures 436 provides for more bending compliance. With a greater population of apertures 436 at the longitudinal center of the sheath 432, the rod assembly 410 becomes more compliant at the center. Any bending is biased toward the center of the rod assembly 410.

Figure 10A:
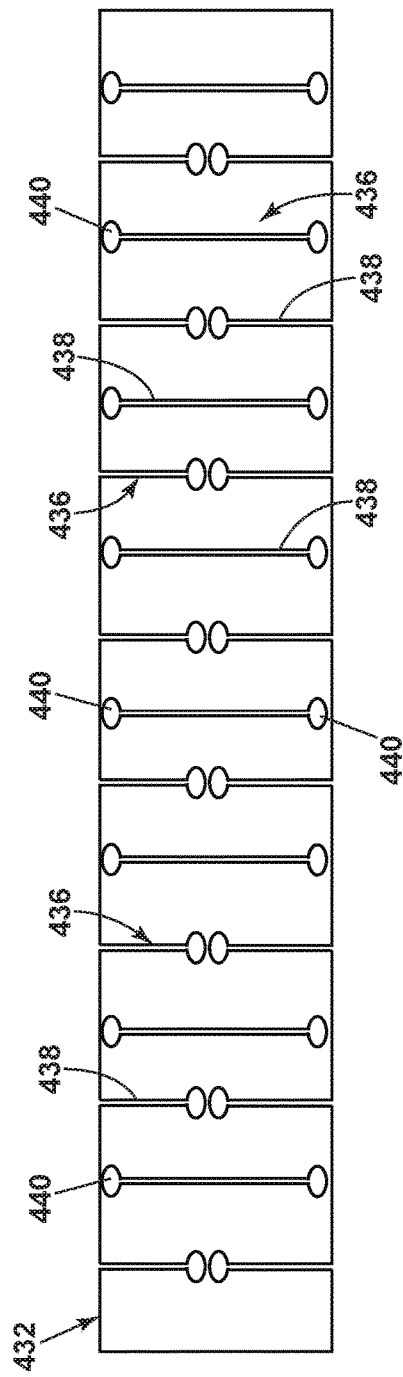
FIG. 10A is a view of an alternative sheath for the sheath of FIG. 9 in a flattened position illustrating a consistent spacing of the cutout pattern, in accordance with various aspects described herein.
Figure 10B:
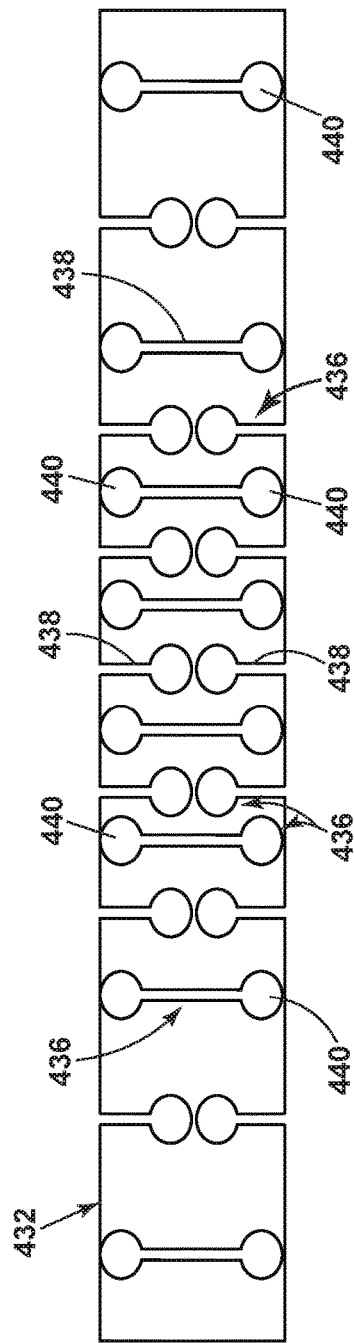
FIG. 10B is a view of another alternative sheath for the sheath of FIG. 9 in a flattened position illustrating a variable spacing for the cutout pattern, in accordance with various aspects described herein.

Referring now to FIGS. 10A and 10B, two exemplary organizations of the apertures 436 of the sheath 432 of FIG. 9 are shown in a flattened position for comparison. Looking at FIG. 10A, the linear slits 438 are thin, with the end openings 440 being relatively small, by comparison. The apertures 436 are evenly spaced along the length of the sheath 432. The evenly spaced apertures 436 provide for an even bending moment along the length of the sheath 432, such as that of FIG. 7. Comparatively, looking at FIG. 10B, the linear slits 438 are thicker and the end openings 440 are larger by comparison. Additionally, the apertures 436 are unevenly spaced, having a greater amount of apertures 436 near the longitudinal center of the sheath 432. As such, the bending moment will be less near the center of the rod assembly 410, tailoring bending of the joint assembly 86 (FIG. 3) near the center of the rod bundles 426.

It should be appreciated, by the comparison of FIGS. 10A and 10B, that the particular apertures 436, including size of the linear slits 438 and end openings 440, can be tuned to a particular mode of bending. More specifically, the shape of bending of the rod bundle within the sheath 432 and the kinematic motion of the bending can be at least partially determined by the sheath 432. For example, the organization of apertures 436 in FIG. 10B will direct bending toward the center of the sheath 432. A larger linear slit 438 or end openings 440 can provide for increased movement of the rod assembly 410, while a smaller linear slit 438 and end openings 440 provide for greater surface area for the sheath 432, having a higher bending moment. Furthermore, providing a greater or lesser number of apertures 436, to a particular position on the sleeve 432, can control the kinematic motion of the rod assembly 410 or the bending moment. Additional factors, such as sheath material, sheath length, and sheath thickness can be important in determining kinematic motion of the rod assembly 410 as well as tuning to particular loading on the joint assembly 86.

It should be further appreciated that while the apertures 436 are shown as having generally circular or arcuate openings 440 between linear slits 438, the apertures 436 should not be so limited. For example, the openings 440 can be circular, oval, elliptical, linear, curvilinear, square, rectangular, unique, or any combination thereof, in non-limiting examples. Furthermore, the slits 438, need not be linear, nor extend in the circumferential direction of the sheath 432 perpendicular to the longitudinal direction of the rod bundle 426. For examples, the slits can be linear, non-linear, curvilinear, or any combination thereof, as well as can have variable cross-sections, such as increasing or decreasing widths. The slits 438 can also extend, in non-limiting examples, in a helical fashion, perpendicular to the longitudinal direction of the rod bundle 426, or parallel to the longitudinal direction of the rod bundle 426, or any combination thereof. Thus, it should be appreciated that the geometry of the apertures 436, openings 438, and slits 438 can be adapted to for a plurality of unique sheaths 432. As such, the particular sheath 432 can be adapted to the particular desired kinematic motion of each individual rod bundle.

Figure 11:
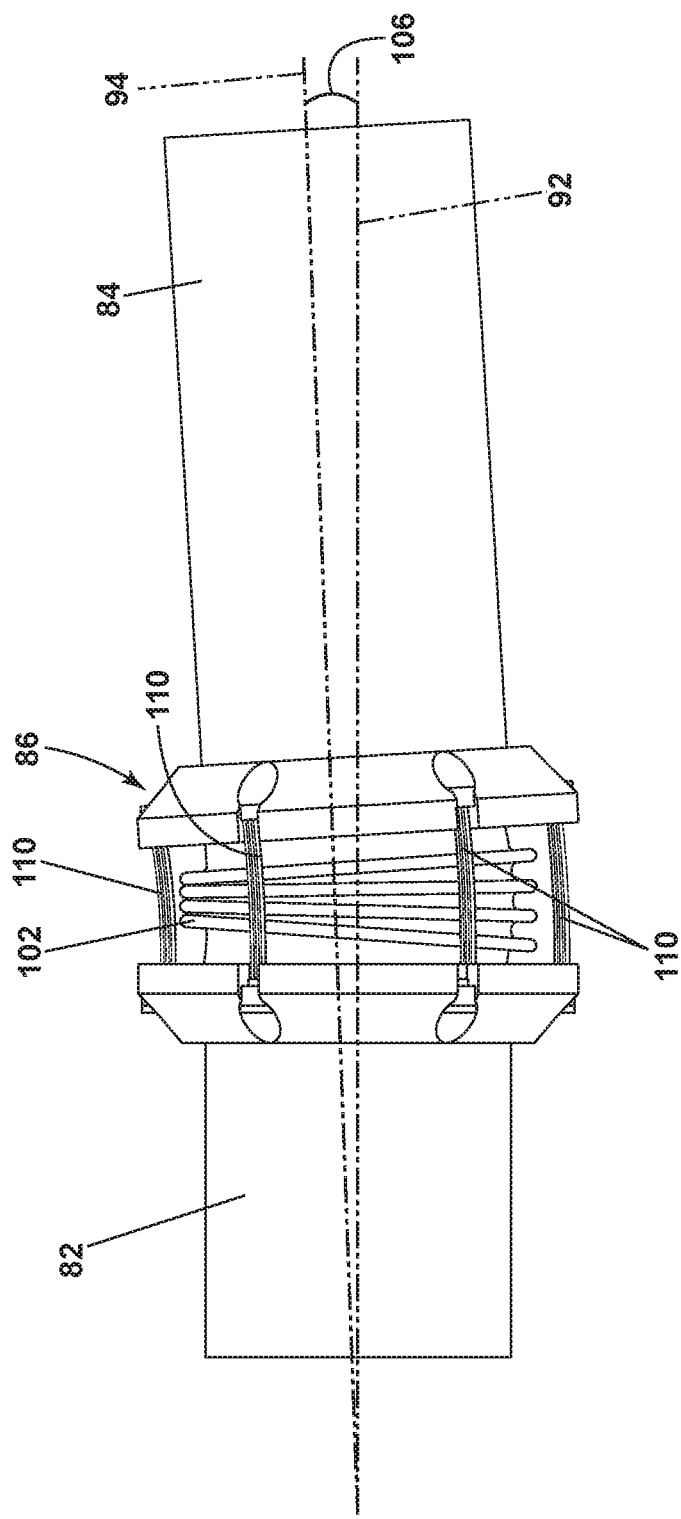
FIG. 11 is a perspective view of the flex hinge of FIG. 3 in a flexed position, in accordance with various aspects described herein.

Turning now to FIG. 11, shows the joint assembly 86 of FIG. 3 in a flexed position, couples the first and second ducts 82, 84 defining a longitudinal axis 92. A load can act upon the joint assembly 86 to orient the second duct 84 in an offset manner relative to the longitudinal axis 92 to define an angled axis 94 along the offset second duct 84. A flex angle 106 can be defined between the longitudinal axis 92 and the angle axis 94. With the load acting upon the joint assembly 86, rod assemblies 110 in combination with the bellows 102 enable the joint assembly 86 to rotate in up to three degrees of freedom under the loads.

The high-pressure joint assemblies described herein have a low total mass, a simplified frictionless, and wear-free design, a flex joint utilizing multiple rods for reduced stresses and low bending moment that is tunable to high-pressure thrust loads.

Typical high-pressure joints consist of massive machined solid bar stock to form matched interfacing inner and outer shrouds. High-pressure thrust loads generate high frictional loads at the interface surfaces of such designs. These loads result in a high bending moment for the flex joint assembly. The flexible joint assembly 86 as described herein uniquely de-couples the high internal thrust pressure loads from the frictional interface reaction shear loads. The flexible joint assembly 86 does not include any frictional interface surfaces to transfer axial thrust loads and provides a rotational kinematic constraint based on the combined rod bundle bending motion. Axial loads are carried directly by the rod assemblies 110, 210, 310, 410. The individual bundles 126, 326, 426 act as rotational bending flexures to allow three rotational degrees of freedom for small angular rotations, such as less than 8 degrees. Axial thrust and bending moment loads are distributed to the individual flexible alloy rods 129, 130, 330, 429. This results in a lightweight, compact, simplified zero-backlash design supporting spherical kinematic motion without interfacial wear, friction, and associated high rotational stiffness.

The frictionless wear-free tunable flexural rod bundles 126, 226, 326, 426 carry the axial thrust and rotational bending loads. For small angular rotations, the individual bundled flexible alloy rods 129, 130, 330, 429 generate a significantly lower bending moment reaction and stress than a single flexural rod with equivalent cross-sectional area. A solid rod of equivalent length will generate significantly higher stresses and reaction moments. For the same geometric magnitude of angular rotation, the maximum bending stress and reaction moment are reduced with the use of multiple small diameter rods.

The axial load capacity of the rod assemblies 110, 210, 310, 410 is tunable and adjustable by changing the number of flexible alloy rods 129, 130, 330, 429 in a rod assembly 110, 210, 310, 410 or the number of rod assemblies 110, 210, 310, 410. Depending on the internal pressure magnitude, the number of rod assemblies 110, 210, 310, 410 is changed by adjusting the inner diameter of a universal bushing 128, 228, 328, 428.

Each rod bundle 126, 326, 426 consists of individual high-temperature spring-tempered nickel (or other) alloy rods that are bundled and attached at the ends with two machined bushings 128, 228, 328. A helical coil protective wrap or sheath 232, 332, 432 is used to protect and constrain the rod bundles 126, 326, 426. Joining of the rod bundles 126, 326, 426 to the bushings 128, 228, 328, 428 can be by welding, brazing, or other equivalent metal joining method. The bushings 128, 228, 328, 428 are then aligned and welded to the mounting tab slots 120 of the two aligned supports 98, 100. To create a slight pre-load for the flex joint assembly 86 the bellows 102 are slightly compressed during assembly and the length L of the rod bundle 126, 326, 426 length between end bushings, is sized to the desired pre-load length.

Stresses from the normal and bending loads can be calculated from closed-form beam equations and superimposed to determine the approximate maximum total tensile stress. The number and diameter of the rod assemblies 110,

210, 310, 410 can be varied to size and optimize the tensile stress for a specific internal pressure. The total tensile stress curve is used to determine the optimal rod assembly diameter. In one example, a rod diameter between 0.022" and 0.027" was selected, while any rod diameter is contemplated.

The joint assembly 86 includes a low total mass, a simplified frictionless and wear-free spherical flexure design, a low bending moment, multiple rods for reduced stresses and moment, and tunable high-pressure thrust load adjustability and capability. The design can be tuned and optimized for strength, kinematic motion, and minimal total mass. The overall kinematic motion of the flexible joint can be controlled by adjusting the helical pitch of the rod bundle 126, 326, 426 the overall length L of the rod bundles 126, 326, 426 and the design parameters of the outer variable pitch helical spring of the rod bundles or the exterior sheath 232, 332, 432.

Additive manufacturing such as 3D printing can be used to manufacture the particular elements having the discrete variable pitches necessary to meet design parameters. Additive direct metal laser melting (DMLM) kinematic link is another option for controlling the desired overall kinematic motion of the flexible joint.

The above disclosure provides a variety of benefits including that a pre-loaded, flexible joint having three degrees or rotational freedom can be provided and can have reduced reaction loading during assembly, operation, and thermal growth of high-temperature bleed-air ducting systems.

To the extent not already described, the different features and structures of the various embodiments can be used in combination as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A duct assembly comprising:
   a first duct;
   a second duct; and
   a flexible joint assembly coupling the first duct to the second duct and comprising:
   a bellows having a first end and a second end;
   a mounting assembly having a first support and a second support and wherein one of the first support and the second support surrounds at least a portion of the bellows;
   a set of rod assemblies with each rod assembly of the set of rod assemblies including a rod bundle and one bushing provided at each end of the rod bundle, with the set of rod assemblies operably coupled to the first support and the second support and spanning a length there between and where the set of rod assemblies are configured to act as rotational flexures to allow three rotational degrees of freedom at the flexible joint assembly; and
   a sheath wrapped around at least a portion of the rod bundle for each rod assembly of the set of rod assemblies, wherein the sheath includes one of a helical coil or a set of apertures, and tailors a bending moment loading for the set of rod assemblies.

2. The duct assembly of claim 1, wherein the rod bundle comprises a set of flexible alloy rods.

3. The duct assembly of claim 1, wherein the rod bundle comprises a set of wound rods having a helical pitch that form a helical wound cable.

4. The duct assembly of claim 1, wherein the helical coil includes a variable pitch.

5. The duct assembly of claim 1, wherein the first support and the second support comprise mounting tab slots with a mouth and throat and the bushings are mounted within the mouth.

6. The duct assembly of claim 1, wherein a length of the rod assembly is sized to correspond to the bellows being in a compressed state such that the bellows are pre-loaded.

7. The duct assembly of claim 1, wherein the rod assemblies of the set of rod assemblies are equally spaced about the mounting assembly.

8. A joint assembly comprising:
   a bellows fluidly coupled to a first duct to a second duct and having a first end and a second end;
   a mounting assembly having a first support and a second support and wherein the first support surrounds at least a portion of the bellows and wherein the second support surrounds at least another portion of the bellows; and
   a set of rod assemblies with each rod assembly of the set of rod assemblies including a rod bundle and two bushings at each end of the rod bundle, with the set of rod assemblies operably coupled to the first support and the second support and spanning a length there between; and
   a protective sheath wrapping at least a portion of an exterior of the rod bundle wherein the protective sheath includes one of a helical coil or a set of apertures.

9. The joint assembly of claim 8, wherein the helical coil comprises a set of wound rods having a helical pitch that form a helical wound cable.

10. The joint assembly of claim 8, wherein the helical coil includes a variable pitch.

11. The joint assembly of claim 8, wherein the first support and second support comprise mounting tab slots with a mouth and a throat and portions of the rod assemblies are mounted within the mouth.

12. The joint assembly of claim 8, wherein a length of the rod assembly is sized to correspond to the bellows being in a compressed state such that the bellows are pre-loaded.

13. A joint assembly, comprising:
   a bellows fluidly coupling a first duct to a second duct and having a first end and a second end and convolutions located there between;
   a mounting assembly having a first support and a second support and wherein the first support surrounds at least a portion of the bellows and wherein the second support surrounds at least another portion of the bellows;
   a set of rod assemblies with each rod assembly of the set of rod assemblies including a rod bundle and a bushing provided at each end of the rod bundle, with the set of rod assemblies operably coupled to the first support and the second support and spanning a length there between and where a length of the rod assemblies is sized to correspond to the convolutions of the bellows being in a compressed state such that the bellows are preloaded; and
a sheath wrapped around at least a portion of the rod bundle for each rod assembly of the set of rod assemblies, wherein the sheath includes one of a helical coil or a set of apertures, and tailors a bending moment loading for the set of rod assemblies.

14. The joint assembly of claim 13, wherein the rod assemblies include at least one rod bundle including a set of wound rods having a helical pitch that form a helical wound cable.

15. The joint assembly of claim 13, wherein the sheath includes a variable pitch.

* * * * *